United States Patent [19]
Widiger, Jr.

[11] 3,760,010
[45] Sept. 18, 1973

[54] PURIFICATION OF 2,4,5-TRICHLOROPHENOL
[75] Inventor: Alexander H. Widiger, Jr., Midland, Mich.
[73] Assignee: The Dow Chemical Company, Midland, Mich.
[22] Filed: July 30, 1970
[21] Appl. No.: 59,740

[52] U.S. Cl............................................. 260/623 R
[51] Int. Cl........................................... C07c 39/32
[58] Field of Search..................... 260/623 R, 624 A

[56] References Cited
UNITED STATES PATENTS
2,925,361  2/1960  Bollenback..................... 260/623 R
3,499,045  3/1970  Cleary........................... 260/623 R Primary Examiner—Bernard Helfin
Assistant Examiner—W. B. Lone
Attorney—Griswold & Burdick, Herbert D. Knudsen and C. E. Rehberg

[57] ABSTRACT 2,4,5-Trichlorophenol containing methoxyphenol impurities is purified by reacting the crude material with aqueous chromic acid and separating the purified product.

3 Claims, No Drawings

PURIFICATION OF 2,4,5-TRICHLOROPHENOL

BACKGROUND OF THE INVENTION 2,4,5-Trichlorophenol containing various methoxyphenol impurities is obtained by the caustic hydrolysis of 1,2,4,5-tetrachlorobenzene in the presence of methanol. These methoxy impurities make the product unacceptable for certain high-purity uses such as the preparation of hexachlorophene. Especially undesirable in the crude trichlorophenol is the presence of the various isomers of monomethoxydichlorophenol. These monomethoxydichlorophenols are believed to form dioxin impurities some of which are ecological and health hazards.

The separation of methoxydichlorophenol is difficult by conventional means such as distillation and washing. As a result of these difficulties, a practical method of separating methoxyphenol impurities from 2,4,5-trichlorophenol has been sought.

SUMMARY OF THE INVENTION

It has now been found according to the present invention that methoxyphenols may be readily separated from 2,4,5-trichlorophenol by selectively reacting methoxydichlorophenols with aqueous chromic acid and separating the products from the 2,4,5-trichlorophenol by conventional methods, such as washing or distillation.

The important and novel aspect of the present invention is the selective reaction of the methoxyphenol impurities in 2,4,5-trichlorophenol by proper adjustment of the amount and concentration of chromic acid employed, the temperature, time and other reaction conditions. Although the exact nature of the selective reaction of the chromic acid in the invention is not understood, it has been found that under the proper reaction conditions, the amount of undesirable methoxy impurities in the trichlorophenol can be reduced if not almost completely eliminated. Such a desirable result and the conditions necessary to obtain this result are best determined in a specific application by experience. In general, however, as more of the methoxyphenols are present in the reaction product, greater amounts and higher concentrations of chromic acid, higher temperatures and longer reaction times are employed to give the desired reduction of the methoxyphenols in the 2,4,5-trichlorophenol.

The amount of methoxyphenols present in the crude 2,4,5-trichlorophenol may vary widely depending on the conditions of the caustic hydrolysis of the tetrachlorobenzene. The amount of methoxydichlorophenols, however, is generally less than 10 percent and is usually less than about 5 percent. Although the main thrust of the present invention is directed toward the methoxyphenol impurities, alkoxyphenol impurities obtained by the caustic hydrolysis of tetrachlorobenzene in other lower alcohols, such as ethanol and propanol, could be reacted in the same manner.

Chromic acid used in the selective reaction of the methoxyphenols present in the 2,4,5-trichlorophenol is well known and is generally prepared in situ by the reaction of an alkali metal dichromate with sulfuric acid. The amount and concentration of the chromic acid may vary widely depending on the concentration and nature of the methoxyphenol impurities. The concentration of the aqueous chromic acid in the reaction must be adjusted in such manner that at the lower limit, the acid selectively reacts with at least a major proportion of the methoxyphenol impurities and at the upper limit, the acid will not deleteriously affect the 2,4,5-trichlorophenol. Although the concentration of chromic acid within these limits is not critical, aqueous chromic acid solution having a concentration of about 0.5 to about 10% by weight of chromic acid are preferred.

The temperatures may vary widely during the course of a reaction, with temperatures above the melting point of the crude trichlorophenol being of special interest because the reaction is most conveniently conducted in a liquid phase. The temperatures, however, should not exceed about 150°C. since excessive amounts of by-products are produced by the action of the chromic acid on the crude trichlorophenol. Preferred are temperatures of 55° to 100°C.

The length of the reaction of the chromic acid with the crude trichlorophenol may vary widely and is interrelated to the concentration of the chromic acid and the temperature employed in the reaction. At temperatures above the melting point of trichlorophenol and within the preferred range of chromic acid concentrations, reaction times of about 30 minutes to about 10 hours are generally sufficient to give the desired reduction in the methoxyphenol impurities.

Although the important and central aspect of the present invention is the use of chromic acid to remove the methoxydichlorophenols, other oxidizing agents may be employed in addition to or partial substitution for the chromic acid. For example, oxygen or potassium permanganate may be employed in addition to the chromic acid in the present invention to enhance the methoxyphenol removal or to improve the economics of the reaction. Generally, as more of other oxidizing agents are employed in the reaction, less of the chromic acid is required to give results similar to those if no additional oxidizing agent were employed.

SPECIFIC EMBODIMENTS

Example 1

In a reactor, 100.0 g. of crude 2,4,5-trichlorophenol containing 3.5 percent monomethoxydichlorophenols was charged and reacted with a solution of 7.5 g. of potassium dichromate in 10.0 cc. of concentrated sulfuric acid and 100 cc. of water. The temperature of the reactor and contents was maintained at 85°C. for 3 hours. At the termination of the reaction, the aqueous phase was separated and discarded. The remaining organic phase was washed with 100 cc. of 12 percent HCl at 75°C., and the aqueous phase was discarded. The wet oil weighed 97 grams and by vapor phase chromatography was analyzed to contain less than 0.05 percent of monomethoxydichlorophenols. Thus, the methoxydichlorophenols were almost totally eliminated from the crude 2,4,5-trichlorophenol.

Example 2

In the same manner as described by Example 1, a reactor was charged with 100 g. of crude 2,4,5-trichlorophenol containing 3.5 percent monomethoxydichlorophenols. This crude 2,4,5-trichlorophenol was then reacted with 1.0 g. of potassium dichromate in 10 cc. of concentrated sulfuric acid and 100 cc. of water at 95°C. During the course of the 4 hour reaction, a stream of oxygen was continuously passed through the reaction mixture. The product was recovered by separating the aqueous inorganic layer and washing with dilute HCl as described in Example 1. The purified product weighed 104 g. and was analyzed by vapor phase chromatography to contain 2% monomethoxydichlorophenols.

In the same manner as described by the examples above, chromic acid may be reacted with crude 2,4,5-trichlorophenol containing methoxyphenols under different reaction conditions and for different periods of time. For example, the crude 2,4,5-trichlorophenol may be reacted at temperatures of 55° to about 150°C. with a suitable amount of about 0.5 to about 10 percent by weight aqueous chromic acid for times of about ½ hour to 10 hours or more to substantially reduce or eliminate the methoxyphenols. Also in the same manner as described by Example 2, other oxidizing agents, such as potassium permanganate, air and ozone, may be employed in the reaction to increase the removal of the methoxyphenols.

I claim:

1. A method of purifying crude 2,4,5-trichlorophenol containing less than 10 percent methoxyphenols by weight of the crude 2,4,5-trichlorophenol, comprising, reacting the methoxyphenols by contacting the crude 2,4,5-trichlorophenol with 0.5 to about 10 weight percent of aqueous chromic acid for about 30 minutes to about 10 hours at from about 50° to about 150°C. in liquid phase, separating the aqueous phase containing the reacted methoxyphenols and recovering the oil phase containing the purified 2,4,5-trichlorophenol.

2. The process of claim 1 wherein the crude 2,4,5-trichlorophenol is simultaneously reacted with a second oxidizing agent.

3. The process of claim 2 wherein the second oxidizing agent is oxygen, air, ozone or potassium permanganate.

* * * * *